United States Patent [19]

Starke

[11] Patent Number: 5,044,849
[45] Date of Patent: Sep. 3, 1991

[54] SCREW ANCHOR
[75] Inventor: David E. Starke, Whitfield, Pa.
[73] Assignee: Emhart Inc., Newark, Del.
[21] Appl. No.: 521,227
[22] Filed: Jun. 1, 1990
[51] Int. Cl.[5] .......................................... F16B 13/04
[52] U.S. Cl. ...................................... 411/38; 411/15
[58] Field of Search ................. 411/38, 34, 15, 55, 411/35, 36, 37, 38, 39, 4

[56]  References Cited
U.S. PATENT DOCUMENTS

| 2,236,079 | 3/1941 | Wipper | 411/38 |
| 3,888,156 | 6/1975 | Fima | 411/38 |
| 3,942,407 | 3/1976 | Mortensen | 411/36 |
| 4,158,983 | 6/1979 | Amico | 411/55 |
| 4,422,813 | 12/1983 | Greenbaum | 411/38 |

Primary Examiner—Rodney M. Lindsey
Attorney, Agent, or Firm—Spencer T. Smith

[57] ABSTRACT

A two part screw anchor which is interconnected by capturing a pin on the receiving bore of a cap in an arcuate slot on the received cylinder of a collapsible part. The collapsible part is metal and the cap (and hence pin) are plastic so that by pushing the collapsible part away from the installed cap the pin will be severed and the two parts can be separated.

3 Claims, 2 Drawing Sheets

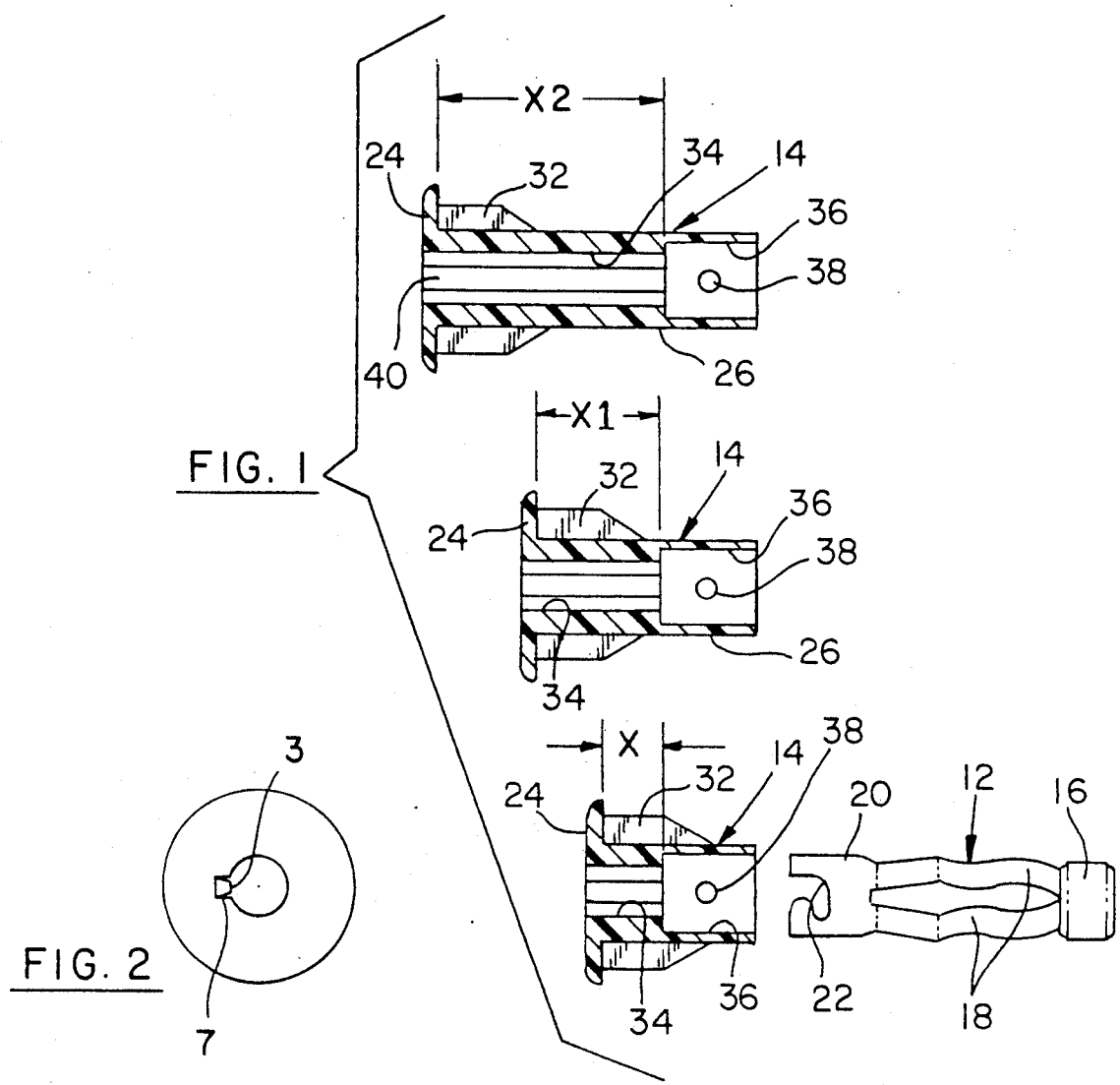
FIG. 1
FIG. 2
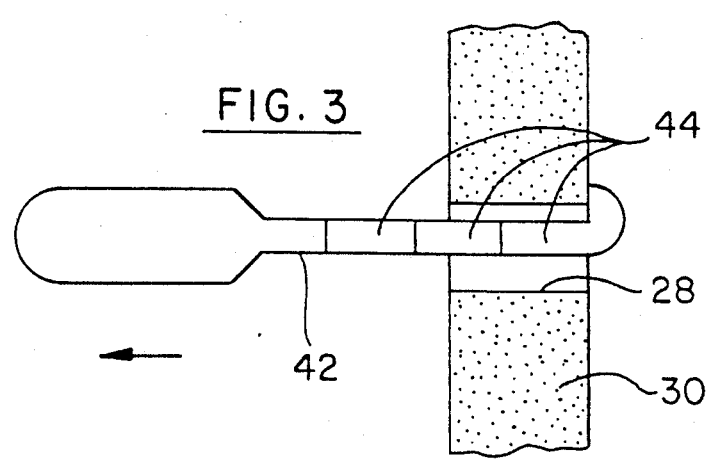
FIG. 3

SCREW ANCHOR

The present invention relates to expansion fasteners which are commonly referred to as blind screw anchors or inserts and more particularly to two piece screw anchors.

One piece screw anchors are not easy to remove once installed. To facilitate removal, screw anchors have been made in two pieces. The collapsible piece has a specially tapered nut end so that a special tool can be inserted into the hole to engage this tapered surface to separate the two pieces. (See U.S. Pat. No. 4,422,813).

It is accordingly an object of the present invention to provide a two piece screw anchor which can be separated after installation without the use of special tools.

It is also an object to provide each standard collapsible portion with a plurality of different length cap portions so that an anchor can be defined which is the correct length for a specific application.

Other objects and advantages of the present invention will become apparent from the following portion of the specification and from the following drawings which illustrate in accordance with the mandate of the patent statutes a presently preferred embodiment incorporating the principles of the invention.

Referring to the drawings:

FIG. 1 is a side view of a nut end and three alternate cap ends (shown in cross section) which can define the expansion anchor of the present invention;

FIG. 2 is an end view of the cap portions shown in FIG. 1;

FIG. 3 shows a gage for determining which of the end caps to be used in a specific application;

Figure 4:
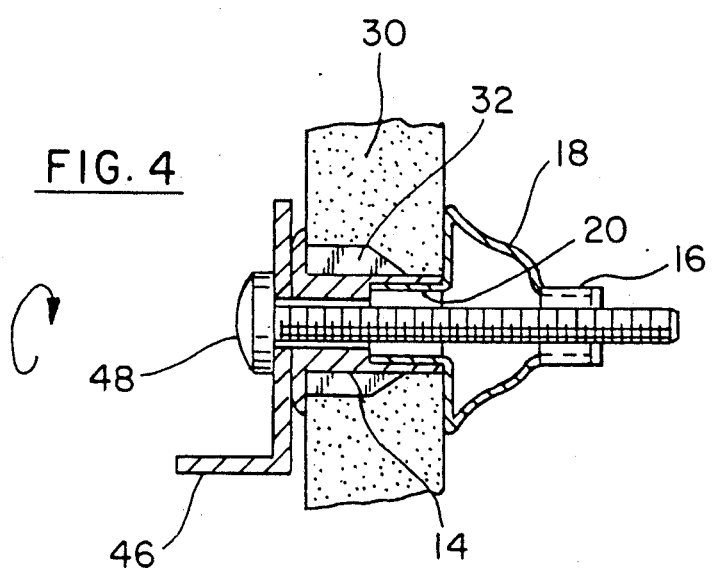
FIG. 4 is a side view of a fully installed screw anchor.
Figure 5:
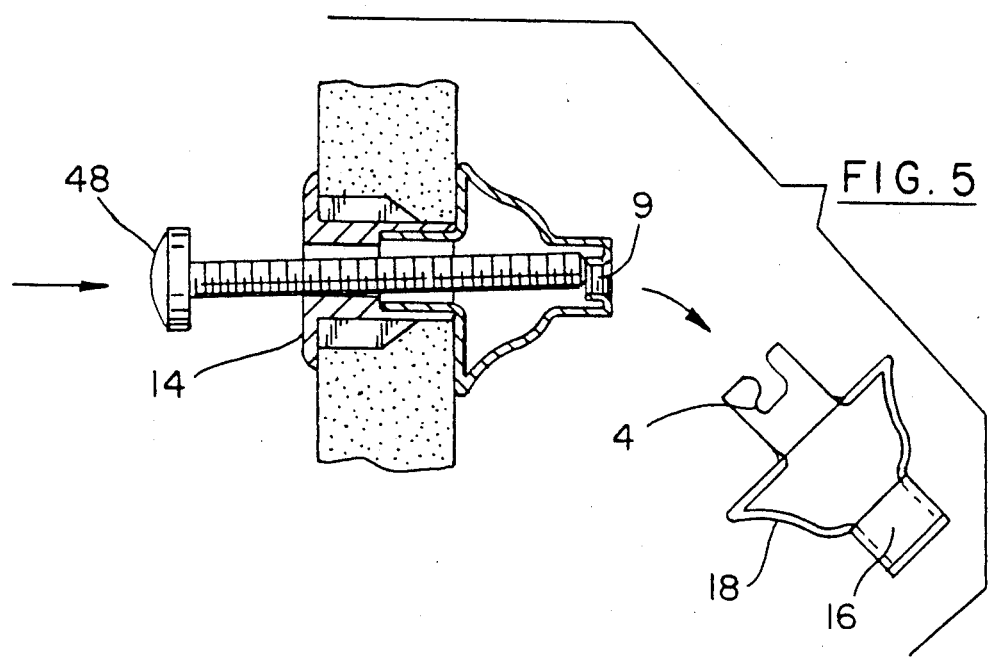
FIG. 5 is a side view showing the separation of the two parts of the screw anchor.
Figure 6:
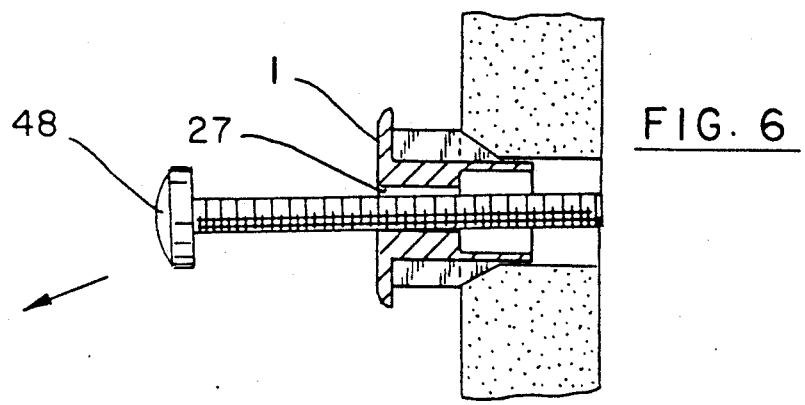
FIG. 6 is a side view showing the removal of the cap portion from the hole.

The screw anchor 10 is made up of a metallic collapsible part 12 and a plastic cap 14. The collapsible part 12 has a cylindrical nut end 16 from which extend a plurality of collapsible legs 18. At the other end of these legs 18 is a latching cylinder 20 which has an arcuate capturing slot 22. The cap 14 has a flange 24 at the end, a cylindrical sleeve 26 which is sized for insertion into a hole 28 in a wall 30 or the like, a plurality of axially extending fins 32 which project outwardly from the sleeve and penetrate into the wall to prevent the cap from rotating, and an end bore 34 which communicates with a latching cylinder receiving bore 36 at the other end. Projecting radially from the surface of the receiving bore 36 is a pin 38 and defined in the inner surface of the end bore 34 is a longitinally extending slot 40 which is aligned with the pin to locate the pin during assembly.

To assemble the screw anchor the pin is aligned with the opening of the capturing slot 22 and the latching cylinder is matingly inserted into the receiving bore. When the assembler holds the end cap towards him and the collapsible end portion away from him the pin 38 which is invisible can be easily aligned with the receiving slot 40 since the slot 22 is viewable and this slot is aligned with the pin. Relative rotation of the two parts locates the pin 38 at the end of the capturing slot thereby connecting the two parts. As shown in FIG. 1 one of a plurality of different length caps (having a different receiving bore to flange length $-X, X1, X2$) depending on the wall thickness. To identify the correct cap to use a gauge 42 (FIG. 3) can be used which has segments 44 corresponding to the different caps.

The secured screw anchor supporting a hook or the like 46 is shown in FIG. 4. To remove the screw anchor the screw 48 is removed from the nut then pushed against the end of the nut. This will result in the plastic pin 38 being severed from the end cap by the cutting action of the capturing slot freeing the two parts. The metallic collapsible part will fall behind the wall. Removing the screw skewed against the cap will pull the cap from the hole. A screw driver can also be inserted into the slotted hole 22 to turn the end cap counterclockwise to separate the parts.

I claim:

1. A screw anchor comprising a metallic collapsible part and a plastic cap part, said metallic collapsible part including
   a nut end,
   a plurality of collapsible legs extending from said nut end,
   a latching cylinder at the other end of said collapsible legs, and
   an arcuate capturing slot defined in said latching cylinder, and said plastic cap part including
   a through bore for receiving a screw,
   a flanged end at one end,
   a latching cylinder receiving bore at the other end,
   a pin projecting radially from said receiving bore to be captured by said arcuate capturing slot when said latching cylinder is inserted into said receiving bore, and a longitudinally extending slot, communicating with said through bore and extending axially inwardly from said flanged end.

2. A screw anchor according to claim 1, wherein said longitudinally extending slot is axially aligned with said pin.

3. A screw anchor according to claim 1, further comprising at least one more plastic cap having a length selected to be different than the length of the other plastic caps for alternately defining a screw anchor having one of a plurality of selected lengths.

* * * * *